United States Patent [19]

Heyn et al.

[11] Patent Number: 4,819,553
[45] Date of Patent: Apr. 11, 1989

[54] COFFEE OR TEA MAKER

[75] Inventors: Hans D. Heyn; Werner Edler, both of Porta Westfalica, Fed. Rep. of Germany

[73] Assignee: Melitta-Werke Bentz & Sohn, Minden, Fed. Rep. of Germany

[21] Appl. No.: 202,635

[22] Filed: Jun. 6, 1988

[30] Foreign Application Priority Data

Jun. 6, 1987 [DE] Fed. Rep. of Germany ....... 8708082

[51] Int. Cl.$^4$ .............................................. A47J 31/00
[52] U.S. Cl. ......................................... 99/305; 99/299
[58] Field of Search ..................................... 99/279–283, 99/295, 299, 300, 301, 304, 305, 306, 307, 316; 426/433

[56] References Cited

U.S. PATENT DOCUMENTS 3,423,209 1/1969 Weber .................................... 99/299
4,713,253 12/1987 Stone ..................................... 99/299
4,771,680 9/1988 Snowball .............................. 99/295

Primary Examiner—Robert W. Jenkins
Attorney, Agent, or Firm—Spencer & Frank

[57] ABSTRACT

A device for making extracts of coffee or tea, including a continuous-flow water heater; a collecting container coupled to the water heater for receiving hot water therefrom; a filter vessel adapted to receive ground coffee or tea leaves; a siphon disposed in the collecting container for discharging hot water from the collecting container into the filter vessel; an outlet pipe forming part of the siphon and projecting into an outlet opening at a lowest location of the collecting container; a seal provided on an exterior surface of the outlet pipe; and a support for axially displaceably holding the outlet pipe. The support has an actuator for moving the outlet pipe into a position in which the seal closes the outlet opening and into another position in which the seal opens the outlet opening for allowing water to be emptied from the collecting container into the filter vessel through the outlet opening.

3 Claims, 1 Drawing Sheet

COFFEE OR TEA MAKER

FIELD OF THE INVENTION

The present invention relates to a coffee or tea maker having a continuous-flow water heater, a filter vessel as well as a collecting container from which the hot water is introduced to the filter vessel. The collecting container is emptied by means of a siphon.

TECHNOLOGY REVIEW

Coffee or tea makers of this type are known and have the advantage of initially collecting the hot water in the collecting container and then transferring the hot water within a relatively short time to the filter vessel.

This method results in advantages for the production of extracts from coffee or tea.

SUMMARY OF THE INVENTION

It is an object of the present invention to provide a coffee or tea machine of the above-outlined type in which the collecting container can be emptied rapidly and without difficulty, even if it is only partially filled with water, for example, during the last brewing interval.

This object and others to become apparent as the specification progresses, are accomplished by the invention, according to which, briefly stated, the outlet tube of the siphon penetrates an opening disposed at the lowest point of the collecting container. The diameter of the opening is greater than the outer diameter of the outlet tube, and the outlet tube is provided on the exterior with a seal for closing the opening of the collecting container and is mounted so as to be axially movable for the purpose of clearing the opening.

If the collecting container of a coffee or tea machine structured according to the invention is only partially filled, for example, during the last brewing interval, trouble-free emptying is made possible in that the outlet tube of the siphon is raised slightly. This clears the opening of the collecting container and, since the opening is arranged at the lowest point of the collecting container, the water in the collecting container is able to flow out directly into the filter vessel.

BRIEF DESCRIPTION OF THE DRAWING

The sole FIGURE is a schematic sectional elevational view of a preferred embodiment of the invention.

DESCRIPTION OF THE PREFERRED EMBODIMENT

Figure 1:
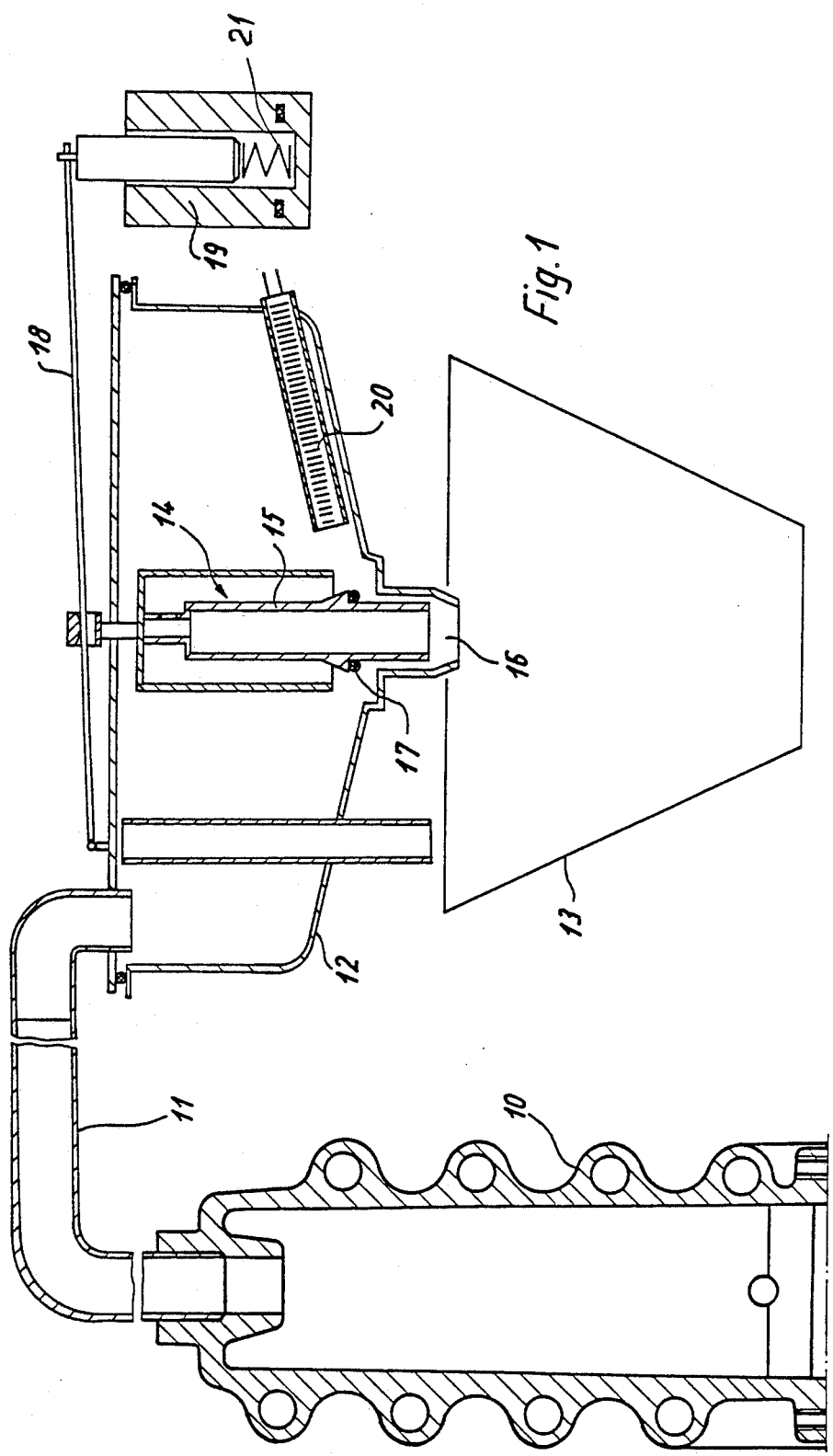

Turning now to the FIGURE, there is shown therein a continuous-flow water heater 10 in which fresh water obtained from a fresh-water container (not shown) is heated and conducted through an overflow pipe 11 into a collecting container 12.

Below the collecting container 12 there is disposed a filter vessel 13 which is normally placed above a coffee or tea pot (not shown) for the produced filtrate.

The collecting container 12 is provided, in a known manner, with a siphon 14, which effects an automatic emptying of the collecting container 12 when a certain filling level therein is exceeded.

The siphon 14 is provided with an outlet pipe 15 which projects through the collecting container 12 in the region of an opening 16 arranged at the lowest location of the collecting container 12. The outlet pipe 15 is provided on its exterior with a seal 17 which, when the outlet pipe 15 is in a lowered position closes the opening 16 by being seated on an annular wall portion surrounding the opening 16.

The outlet pipe 15 is mounted to move axially by means of a pivot lever 18 actuated by an electromagnet 19.

The outlet pipe 15 is shown in a raised position clearing the opening 16 of the collecting container 12. Residual water quantities that may have remained in the collecting container 12 could, in this position, flow immediately out of the opening 16 into the filter vessel.

If, however, the outlet pipe 15 of the siphon 14 is moved downward, the seal 17 positions itself on the edge region of the opening 16 and seals this opening 16 from the exterior. In this position, the water from the collecting container 12 can only flow out once the siphon 14 is activated.

According to the arrangement shown in the FIGURE, the seal 17 closes the opening 16 in the energized state of the electromagnet 19, and the seal 17, by virtue of a spring 21, lifts off its seal to allow flow from the collecting container 12 through the opening 16 in the depicted, de-energized state of the electromagnet 19.

Advantageously, the collecting container 12 is provided with an electrical resistance heating element 20 to maintain the water contained in the collecting container 12 at a certain brewing temperature.

The present disclosure relates to the subject matter disclosed in Federal Republic of Germany Application No. G 87 08 082 filed June 6, 1987, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. In a device for making extracts of coffee or tea, including
   a continuous-flow water heater;
   a collecting container coupled to the water heater for receiving hot water therefrom;
   a filter vessel adapted to receive ground coffee or tea leaves;
   siphon emptying means disposed in said collecting container for discharging hot water from the collecting container into the filter vessel;
   the improvement comprising:
   (a) means defining an outlet opening at a lowest location of said collecting container;
   (b) an outlet pipe forming part of said siphon emptying means and projecting into said outlet opening;
   (c) a seal provided on an exterior surface of said outlet pipe; and
   (d) a support means for axially displaceably holding said outlet pipe; said support means including an actuating means for moving said outlet pipe into a first position in which said seal closes said outlet opening and for moving said outlet pipe into a second position in which said seal opens said outlet opening for allowing water to be emptied from said collecting container into said filter vessel through said outlet opening.

2. A device as defined in claim 1, wherein said actuating means comprises an electromagnetically operated pivot lever; said outlet pipe being suspended from said pivot lever.

3. A device as defined in claim 1, further comprising an electrical resistance heating element disposed in said collecting container to supply heat to said hot water.

* * * * *